US012670014B2

(12) United States Patent　　(10) Patent No.:　US 12,670,014 B2
Tsirkin　　(45) Date of Patent:　*Jun. 30, 2026

(54) REVERSE RESTARTABLE SEQUENCES FOR LOCK POLLING SCALABILITY

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/503,594

(22) Filed: Oct. 18, 2021

(65) Prior Publication Data

US 2022/0035664 A1　　Feb. 3, 2022

Related U.S. Application Data

(63) Continuation of application No. 16/560,277, filed on Sep. 4, 2019, now Pat. No. 11,150,945.

(51) Int. Cl.
　*G06F 9/48*　　(2006.01)
　*G06F 9/52*　　(2006.01)
(52) U.S. Cl.
　CPC ............ *G06F 9/4881* (2013.01); *G06F 9/526* (2013.01)
(58) Field of Classification Search
　CPC ............................... G06F 9/4881; G06F 9/526
　See application file for complete search history.

(56) References Cited

U.S. PATENT DOCUMENTS

| | | | | |
|---|---|---|---|---|
| 6,378,124 B1 * | 4/2002 | Bates | .................. | G06F 11/3664 |
| | | | | 714/707 |
| 6,438,573 B1 * | 8/2002 | Nilsen | ................... | G06F 9/4887 |
| | | | | 718/100 |
| 6,697,834 B1 * | 2/2004 | Dice | ....................... | G06F 9/526 |
| | | | | 718/107 |
| 7,581,048 B1 * | 8/2009 | Budd | .................... | G06F 11/201 |
| | | | | 714/43 |
| 9,632,569 B2 | 4/2017 | Suarez Gracia et al. | | |
| 9,678,897 B2 | 6/2017 | Wang et al. | | |
| 10,169,107 B2 | 1/2019 | Greco | | |

(Continued)

FOREIGN PATENT DOCUMENTS

| | | |
|---|---|---|
| CN | 106227656 B | 7/2018 |

OTHER PUBLICATIONS

The EfficiOS team "The 5-year Journey to Bring Restartable Sequences to Linux"; Published Feb. 8, 2019; (13 Pages).

*Primary Examiner* — Jorge A Chu Joy-Davila
(74) *Attorney, Agent, or Firm* — Kilpatrick Townsend & Stockton LLP

(57)　　　　　　ABSTRACT

An example system includes a memory, at least one processor in communication with the memory, a plurality of threads executing on the at least one processor, and a supervisor. The supervisor is configured to preempt a first thread of the plurality of threads and determine a status of the first thread as either (i) executing in an atomic section or (ii) executing outside of the atomic section. The atomic section is a region of code tagged as atomic, and the atomic section includes instructions that run under a lock. Responsive to determining the status as executing in the atomic section, the supervisor is configured to notify a second thread of the plurality of threads to execute a system call based lock to block execution until the lock is released by the first thread.

18 Claims, 6 Drawing Sheets

(56)     References Cited

U.S. PATENT DOCUMENTS

| 2004/0025160 | A1* | 2/2004 | Dice | ....................... | G06F 9/526 |
| | | | | | 718/102 |
| 2007/0124398 | A1* | 5/2007 | Parkinson | .............. | G06Q 10/10 |
| | | | | | 709/206 |
| 2007/0256058 | A1 | 11/2007 | Marfatia et al. | | |
| 2014/0189260 | A1 | 7/2014 | Wang et al. | | |
| 2015/0286586 | A1* | 10/2015 | Yadav | ..................... | G06F 9/526 |
| | | | | | 711/152 |
| 2015/0326448 | A1 | 11/2015 | Chaudhary et al. | | |
| 2017/0039094 | A1 | 2/2017 | Dice | | |
| 2017/0344403 | A1 | 11/2017 | Stults et al. | | |
| 2018/0239652 | A1* | 8/2018 | Tsirkin | ..................... | G06F 9/52 |
| 2018/0293114 | A1* | 10/2018 | Mukherjee | .............. | G06F 9/524 |
| 2019/0332427 | A1* | 10/2019 | Tian | ........................ | G06F 21/78 |
| 2020/0233705 | A1* | 7/2020 | Alkalay | ............... | G06F 3/0683 |

* cited by examiner

REVERSE RESTARTABLE SEQUENCES FOR LOCK POLLING SCALABILITY

CROSS REFERENCES TO RELATED APPLICATIONS

This application is a continuation application of and claims priority to and the benefit of U.S. patent application Ser. No. 16/560,277, filed Sep. 4, 2019, now issued as U.S. Pat. No. 11,150,945 on Oct. 19, 2021, the entire disclosure of which is hereby incorporated by reference herein.

BACKGROUND

Computer systems may run applications and processes that execute various instructions on a processor. Processors may execute instructions to perform tasks and complete work orders that may include instructions to read, write, and copy memory entries. The processors may use threads to complete tasks or work orders. Physical resources, such as a hardware thread, may be associated with a processing core. Additionally, an operating system may schedule the software threads. A software thread, which may be referred to as a thread of execution (or simply a thread) is a software unit. In a multi-processor/multi-core system, multiple threads can be executed in parallel. That is, each of the processors or cores may execute a thread simultaneously. One thread can pass a request to another thread to cause the request to be executed.

The various instructions may require resources on the computer system, which may have limited access to resources or may require locks for certain resources. For example, a lock may need to be acquired before accessing data protected by the lock to ensure mutual exclusion and that the correct data is obtained. Other locks, such as a spinlock may cause a processor thread trying to acquire the lock to wait in a loop (e.g., spin) while repeatedly checking if the lock is available. After the lock becomes available, the processor may access the resource. For example, the lock ensures a reliable transaction when accessing the data by preventing lost updates or dirty reads due to accessing the data before a lock has been released.

SUMMARY

The present disclosure provides new and innovative systems and methods for reversible restartable sequences for lock polling scalability. In an example, a system includes a memory, at least one processor in communication with the memory, a plurality of threads executing on the at least one processor, and a supervisor. The supervisor is configured to preempt a first thread of the plurality of threads and determine a status of the first thread as either (i) executing in an atomic section or (ii) executing outside of the atomic section. The atomic section is a region of code tagged as atomic, and the atomic section includes instructions that run under a lock. Responsive to determining the status as executing in the atomic section, the supervisor is configured to notify a second thread of the plurality of threads to execute a system call based lock to block execution until the lock is released by the first thread.

In an example, a method includes preempting, by a supervisor, a first thread and determining a status of the first thread as either (i) executing in an atomic section or (ii) executing outside of the atomic section. The atomic section is a region of code tagged as atomic, and the atomic section includes instructions that run under a lock. The method also includes, responsive to determining the status as executing in the atomic section, notifying, by the supervisor, a second thread to execute a system call based lock to block execution of the second thread until the lock is released by the first thread.

In an example, a method includes preempting, by a supervisor, a first thread and determining a status of the first thread as either (i) executing in an atomic section or (ii) executing outside of the atomic section. The atomic section is a region of code tagged as atomic, and the atomic section includes instructions that run under a lock. The method also includes, responsive to determining the status as executing in the atomic section, notifying, by the supervisor, a second thread to enter a sleep state after polling for a predetermined time interval.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
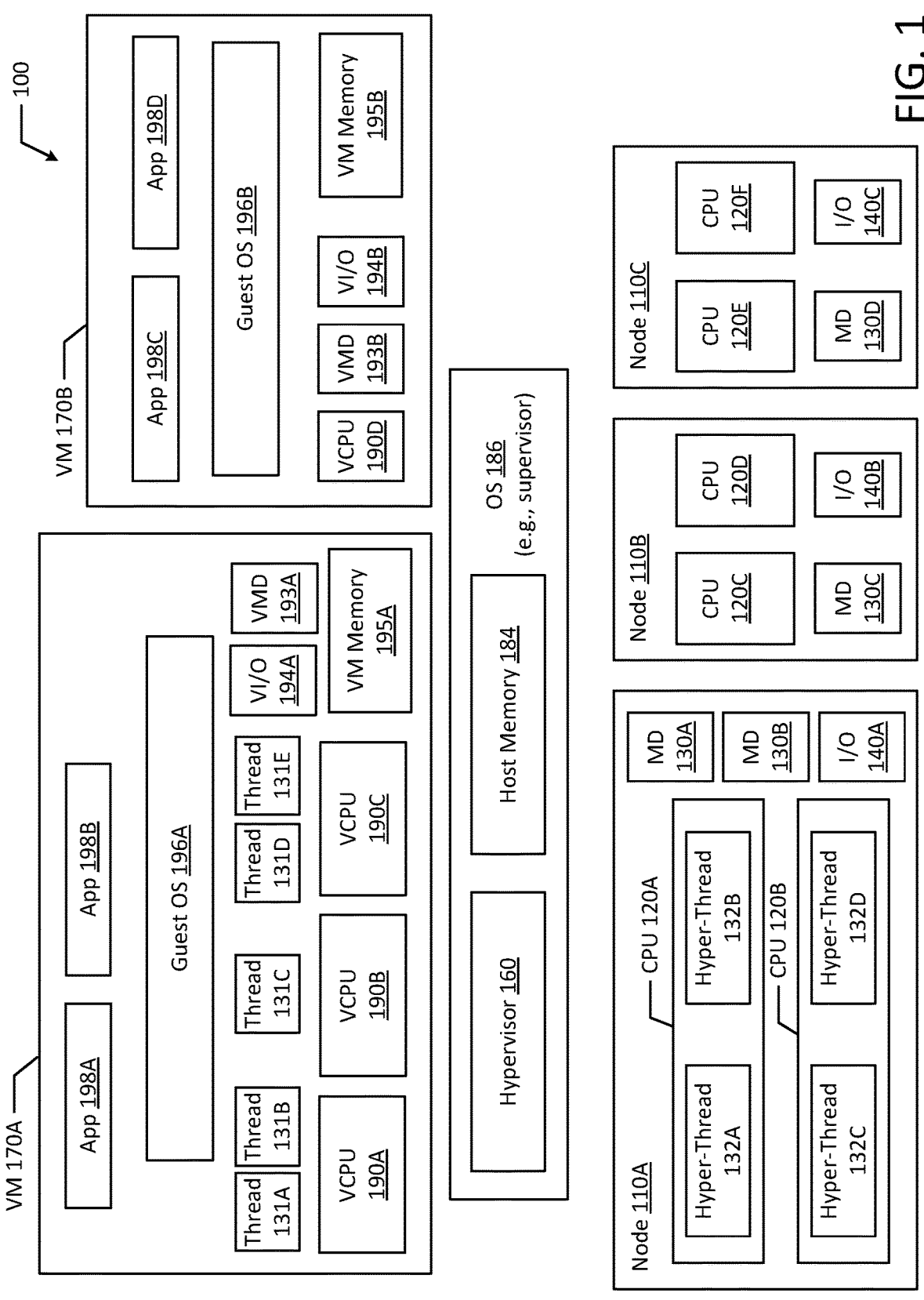
FIG. 1 illustrates a block diagram of an example computing system according to an example embodiment of the present disclosure.

Techniques are disclosed for reverse restartable sequences for lock polling scalability. Signaling overhead is often a major source of overhead in multi-threaded applications. In particular, a contended lock typically executes a system call(s) to block a thread and later unblock a thread. However, system calls are computationally expensive because system calls typically lead to a context switch. For example, a context of the running process is loaded into memory and then the context of system-call is loaded into a CPU (e.g., this is the first context switch). Then, a context of the process is loaded back into the CPU, thereby causing one more context switch. Furthermore, if a system call is related to a disk read-write, the system call may also include I/O wait time, which may waste processor time without performing any useful tasks.

To avoid executing system calls to block and later unblock a thread, polling may be used, which typically works well when two threads run concurrently on two processors (e.g., CPUs). For example, the polling approach may utilize a spinlock and may be implemented by using an atomic test to set the spinlock without the need for system calls. Specifically, the spinlock may be built using an atomic test-and-set instruction that either obtains the lock or spins in a while-loop while waiting to acquire the lock. The test-and-set instruction may be used to write to a memory location and return the old value as a single atomic operation. Using a spinlock for polling may be used for contended or non-contended cases.

Unfortunately, when using a spinlock for polling, if a thread holding a lock gets blocked, another thread will spin for an extended period of time and waste CPU cycles. Another solution is to implement a polling mutex to limit that amount of time polling occurs. For example, the polling mutex may limit polling or a spinlock for a short period of time. However, a polling mutex either (i) wastes cycles waiting too long for a blocked thread to release (e.g., give up) a lock or (ii) stops the polling/spinlock too soon and incurs latency when the lock owner is delayed. Furthermore, a polling mutex may be difficult to tune. For example, the amount of time a processor or thread waits for a resource protected by a lock on one particular machine (e.g., x86 machine) may be inappropriate or may not work well on a slower machine (e.g., Advanced RISC Machine "ARM" system-on-chip ("SoC")).

In some cases, per-CPU data structures may be used where a data structure is used for each CPU. As a simple example, instead of incrementing a global counter for every disk operation, which may cause an associated cache line to bounce continually between processors, each CPU may maintain its own set of counters locally (e.g., per-CPU counters) so that each CPU does not have to contend with any other CPU to increment one of those counters. Restartable sequences may provide a workaround for per-CPU data structures, where a region of code is tagged as restartable and a kernel can detect when a restartable sequence is used with atomic, lockless code sequences and can cancel operations and resubmit them in case of preemption. However, some code sequences may require a lock and may be incompatible or non-convertible to a lockless version. Additionally, some implementations may be unable to use per-CPU data structures.

To solve the problems discussed above, an operating system or a supervisor may be extended to support a region of code that is tagged as atomic (e.g., a reverse restartable sequence of code). If a thread is preempted by the supervisor, the supervisor may check that the thread is executing in the atomic region of code (e.g., atomic range). If the thread is executing in the atomic range, the supervisor may send a signal to another thread by either sending a signal or modifying memory. For example, a portion of code that owns a lock may be tagged as atomic such that if the thread that acquires that lock gets preempted, other threads that would typically poll or spin waiting for the lock instead receive a signal or notification to execute a system call based lock (e.g., using a futex system call) to block further execution until the lock is released. By blocking execution of the other thread(s) until the lock is released, the systems and methods described herein advantageously prevent wasting CPU cycles spinning while waiting for a lock, and also reduce latency that is incurred using a polling mutex when the lock owner is delayed.

Furthermore, to ensure that other threads are notified only when the lock is taken, the atomic range (also referred to as the atomic section or atomic region) may include instructions that run under the lock such that only the thread owning the lock runs within the atomic range. The techniques discussed herein prevent system calls (even with contended locks) until a lock owner is actually preempted. By preventing system calls until a lock owner is preempted, the systems and methods disclosed herein advantageously reduce the occurrence of system calls thereby using a less computationally expensive method of waiting for and obtaining contended resources, thereby improving performance and throughput. Additionally, by avoiding unnecessary system calls, the scalability for applications is improved which advantageously allows for packing more applications per CPU core.

A mutual exclusion or "mutex" is a requirement that one thread of execution never enters its critical section at the same time another concurrent thread of execution enters its own critical section in order to prevent race conditions. For example, mutual exclusion addresses the problem of resource sharing where multiple processes have access to a shared resource and where each process needs exclusive control of that resource while doing its work. The mutual-exclusion solution to this makes the shared resource available only while the process is in a specific code segment called a critical section. A mutex controls access to the shared resource by controlling each mutual execution of that part of its program where the resource would be used.

A futex is a "fast userspace mutex", which is a kernel system call that may be used to implement basic locking or may be used for higher-level locking. For example, a futex system call is typically used as a blocking construct and may be used when a program has to block for a longer time until a condition becomes true. A futex may include a wait queue that is attached to an atomic integer in the userspace. For example, a futex is essentially an address to an atomic integer where the address is used as the identifier for a queue of waiting threads. The value of the atomic integer at that address is used to implement the fast path with atomic operations and to cope with race conditions. A futex has two basic operations of "WAIT" and "WAKE" and may also include a "REQUEUE" operation that is available that functions as a generic "WAKE" operation and can move threads between waiting queues. For example, a futex may be used to put a current thread to sleep or to wake up a thread. Multiple processes or threads operate on the atomic integer entirely in userspace (using atomic operations to avoid interfering with one another), and only resort to relatively expensive system calls to request operations on the wait queue (for example to wake up waiting processes, or to put the current process on the wait queue). A properly programmed futex-based lock will not use system calls except when the lock is contended; since most operations do not require arbitration between processes, this will not happen in most cases.

FIG. 1 depicts a high-level component diagram of an example computing system 100 in accordance with one or more aspects of the present disclosure. The computing system 100 may include an operating system (e.g., host OS 186), one or more virtual machines (VM 170A-B), and nodes (e.g., nodes 110A-C).

The host operating system ("OS") 186 may also be referred to herein as supervisor 186. In an example, the supervisor may be a hypervisor or the host OS 186. Additionally, the host OS 186 may include the supervisor or a hypervisor. The supervisor 186 may be a program. For example, the supervisor 186 may be a program that constitutes the core of the host OS. As used herein, the supervisor 186 may refer to a privileged software component of the host OS. For example, the supervisor may have the ability to change memory mappings for an application (e.g., Application 198A-D). Additionally, the supervisor 186 may act as a controller of multiple processes including individual user processes within an application memory space. For example, the supervisor 186 may perform several tasks such as executing processes and handling interrupts. The supervisor 186 may also provide basic services such as memory management, process management, file management, and I/O management. In an example, the supervisor 186 may be a kernel or may be part of a kernel.

The host OS or supervisor 186 may notify threads (e.g., hyper-threads or software threads) when a lock-owning thread is preempted while executing an atomic range of instructions, which may advantageously prevent the threads from spinning and wasting CPU cycles while waiting for a lock. In an example, each thread may include a thread identifier and the notification from the supervisor 186 may include the respective thread identifier of the thread being preempted. Similarly, the lock may be configured to store an owner identifier to indicate which thread currently owns the lock.

Virtual machines 170A-B may include a guest OS, guest memory, a virtual CPU (VCPU), virtual memory devices (VIVID), and virtual input/output devices (VI/O). For example, virtual machine 170A may include guest OS 196A, guest memory or virtual machine memory 195A, a virtual CPUs 190A-C, a virtual memory devices 193A, and virtual input/output device 194A. Virtual machine memory 195A may include one or more memory pages. Similarly, virtual machine 170B may include guest OS 196B, virtual machine memory 195B, a virtual CPU 190D, a virtual memory devices 193B, and virtual input/output device 194B. Virtual machine memory 195B may include one or more memory pages.

The computing system 100 may also include a hypervisor 160 and host memory 184. Hypervisor 160 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

Software threads (e.g., threads 131A-E) may be created by an application or a program (e.g., App 198A-B) and may be scheduled by a guest OS (e.g., guest OS 196A). A software thread, which may be referred to as a thread of execution (or simply a thread 131) is a software unit. As illustrated in FIG. 1, each virtual processor 190A-C may run one or more threads 131A-E. For example, VCPU 190A may run threads 131A-B, VCPU 190B may run thread 131C, and VCPU 190C may run threads 131D-E. A thread or ordered sequence of instructions may allow the virtual processors to execute multiple instruction streams simultaneously. For example, VCPU 190A may simultaneously run two instruction streams on threads 131A-B. Threads 131 are shown for illustrative purposes, it should be understood that each VCPU 190A-D may execute more than two threads 131.

In an example, a virtual machine 170A may execute a guest operating system 196A and run applications 198A-B which may utilize the underlying VCPU 190A, VMD 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186. In an example embodiment, a device may be implemented as a virtual machine (e.g., virtual machine 170A-B).

The computer system 100 may include one or more nodes 110A-C. Each node 110A-C may in turn include one or more physical processors (e.g., CPU 120A-F) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

The processors (e.g., CPU 120A-F) may use threads to complete tasks or work orders. Physical resources, such as a hardware thread or hyper-thread 132A-D, may be associated with a processing core. For example, there may be a single hardware thread or hyper-thread 132A-D per core on a processor. In a multi-processor/multi-core system, multiple threads can be executed in parallel. That is, each of the processors or cores may execute a thread simultaneously. One thread can pass a request to another thread to cause the request to be executed. As illustrated in FIG. 1, the hypervisor 160 executing on a plurality of physical processors may execute a VCPU of a virtual machine which is executing on a first hyper-thread (e.g., hyper-thread 132A) of the physical processor or CPU 120A. The physical processor 120A may include hyper-threads 132A-B and physical processor 120B may include hyper-threads 132C-D. Virtual machines may execute in different hyper-threads of the same processor. For example, the virtual machine 170A may execute in hyper-thread 132A while virtual machine 170B executes in hyper-thread 132B of CPU 120A. Conversely, virtual machines may execute in hyper-threads of different processors. For example, the virtual machine 170A may execute in hyper-thread 132A of CPU 120A while virtual machine 170B executes in hyper-thread 132D of CPU 120B.

As used herein, physical processor or processor 120A-F refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). In a further aspect, a processor may provide a hyper-threading technology where a single physical processor may appear as two logical processors (e.g., hyper-threads 132A-B and hyper-threads 132C-D). In a processor (e.g., CPU 120A) using the hyper-threading technology, the physical processor resources are shared between the two logical processors and the architectural state is duplicated for the two logical processors (e.g., 132A and 132B). In an example, each processor may include more than two logical processors (e.g., three or four hyper-threads).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-F may be interconnected using a variety of techniques, ranging from a point-to-point processor interconnect, to a system area network, such as an Ethernet-based network. Local connections within each node, including the connections between a processor 120A-F and a memory device 130A-D may be provided by one or more local buses of suitable architecture, for example, peripheral component interconnect (PCI).

Figure 2:
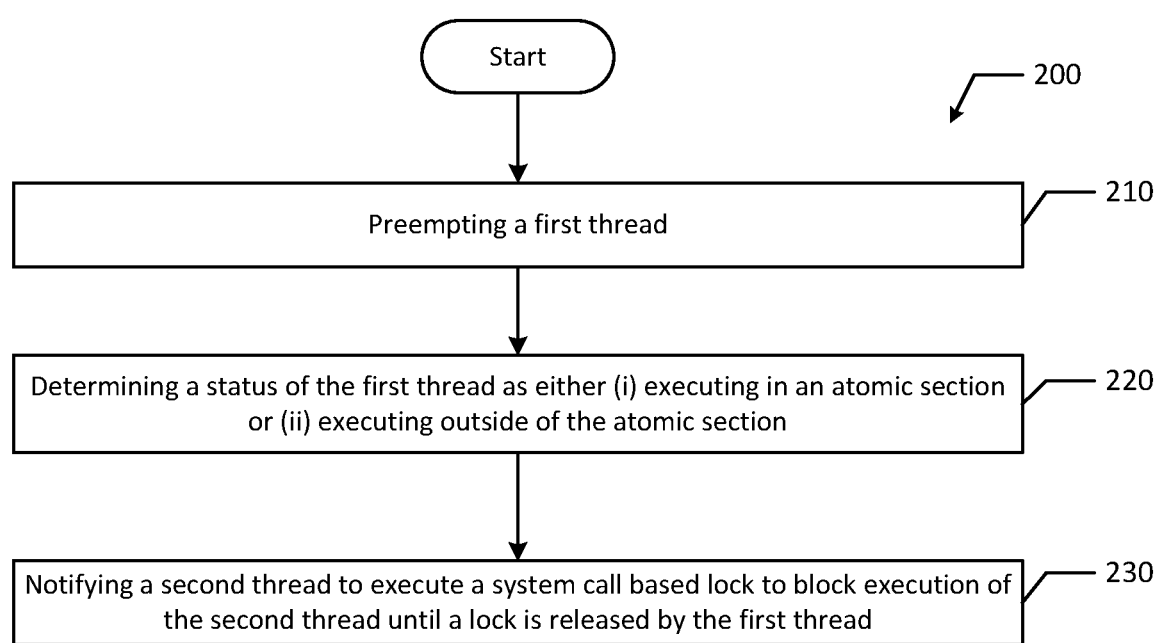
FIG. 2 illustrates a flowchart of an example process for reverse restartable sequences for lock polling scalability according to an example embodiment of the present disclosure.

FIG. 2 illustrates a flowchart of an example method 200 for reverse restartable sequences for lock polling scalability according to an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. The method 200 may be performed by processing logic that may comprise hardware (circuitry, dedicated logic, etc.), software, or a combination of both.

The example method 200 includes preempting a first thread (block 210). For example, a supervisor 186 may preempt a thread (e.g., a software thread 131A or a hyper-thread 132A). For example, the supervisor 186 may preempt the thread by sending an interrupt to the thread (e.g., a software thread 131A). In another example, the supervisor 186 may preempt a hyper-thread 132A by sending and interrupt to the hyper-thread 132A. The method also includes determining a status of the first thread as either (i) executing in an atomic section or (ii) executing outside of the atomic section (block 220). The supervisor 186 may determine a status of the thread (e.g., a software thread 131A) as either executing in the atomic section or executing outside of the atomic section. In another example, the supervisor 186 may determine the status of a hyper-thread 132A as either executing in the atomic section or executing outside of the atomic section. The atomic section may be a region of code, instruction or set of instructions that are tagged as atomic. For example, the atomic section may include instructions that run under a lock.

In an example, the lock, such as a spin lock, may protect a resource to ensure that the resource (e.g., database table) is up to date before it is retrieved. Specifically, the lock may limit access to the resource by preventing a processor or thread from accessing the corresponding data before acquiring the lock. For example, the resource may include data that is periodically updated and modified by other processes. The lock may ensure that only one process (e.g., process currently holding the lock) is accessing the resource at a time to prevent a processor or thread from obtaining information from the resource before the resource is updated or from accessing the resource while it is being modified, thereby resulting in a dirty read. In an example, the lock may be a mutex where only a single thread can hold the lock. In another example, the lock may be a read-write lock where a writer excludes readers, but readers do not exclude each other. Other varieties of locks may be used and the lock may be of any kind.

Additionally, the method includes notifying a second thread to execute a system call based lock to block execution of the second thread until a lock is released by the first thread (block 230). For example, the supervisor 186 may notify a second thread (e.g., a software thread 131C) to execute a system call based lock (e.g., using a futex system call) to block execution of the second thread until the lock is released by the first thread (e.g., software thread 131A). In another example, the supervisor may notify a second hyper-thread 132C to execute a system call based lock (e.g., using a futex system call) to block execution of the second thread until the lock is released by the first hyper-thread 132A. The supervisor 186 may notify the second thread by sending a signal to the second thread. By sending a signal to the second thread, a lock (e.g., a contended lock) does not cause a system call until the lock-owning thread is preempted, which reduces the occurrence of system calls and reduces consumption of system resources.

Figure 3:
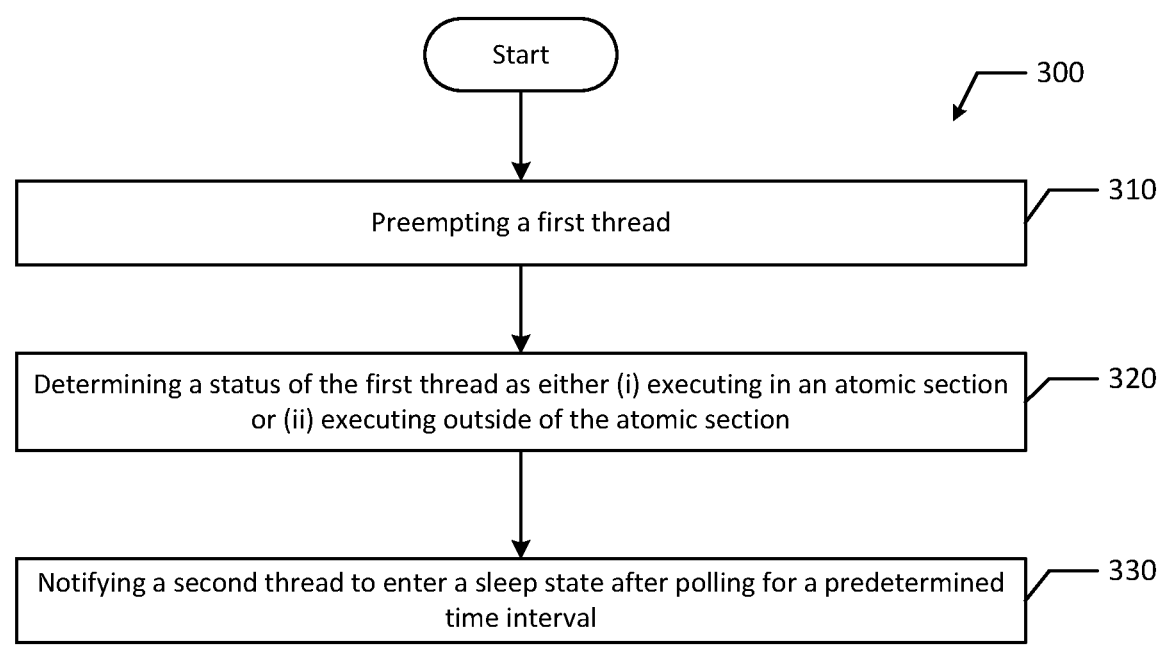
FIG. 3 illustrates a flowchart of an example process for reverse restartable sequences for lock polling scalability according to an example embodiment of the present disclosure.

FIG. 3 illustrates a flowchart of an example method 300 for reverse restartable sequences for lock polling scalability according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

The example method 300 includes preempting a first thread (block 310). Similar to block 210 of method 200, a supervisor 186 may preempt a software thread 131A. In another example, the supervisor 186 may preempt a hyper-thread 132A. The method also includes determining a status of the first thread as either (i) executing in an atomic section or (ii) executing outside of the atomic section (block 320). Similar to block 220 of method 200, the supervisor 186 may determine a status of the software thread 131A as either executing in the atomic section or executing outside of the atomic section. In another example, the supervisor 186 may determine a status of the hyper-thread 132A as either executing in the atomic section or executing outside of the atomic section. The atomic section may be a region of code, instruction or set of instructions that are tagged as atomic. For example, the atomic section may include instructions that run under a lock.

Then, the method includes notifying a second thread to enter a sleep state after polling for a predetermined time interval (block 330). For example, responsive to determining the status as executing in the atomic section, the supervisor 186 may notify the second thread (e.g., a software thread 131C or a hyper-thread 132C) to enter a sleep state after polling for a predetermined time interval. In an example, the second thread (e.g., a software thread 131C or a hyper-thread 132C) may be notified to enter a sleep state prior to polling (e.g., a time interval of "0 seconds"). For example, by notifying the second thread to enter a sleep state, the second thread (e.g., a software thread 131C or a hyper-thread 132C) may sleep (while the resource or lock is unavailable) instead of cycling in a spin loop and wasting resources. In another example, the second thread (e.g., a software thread 131C or a hyper-thread 132C) may advantageously execute new operations while the lock is unavailable to optimize performance and reduce processor down time.

Figure 4A:
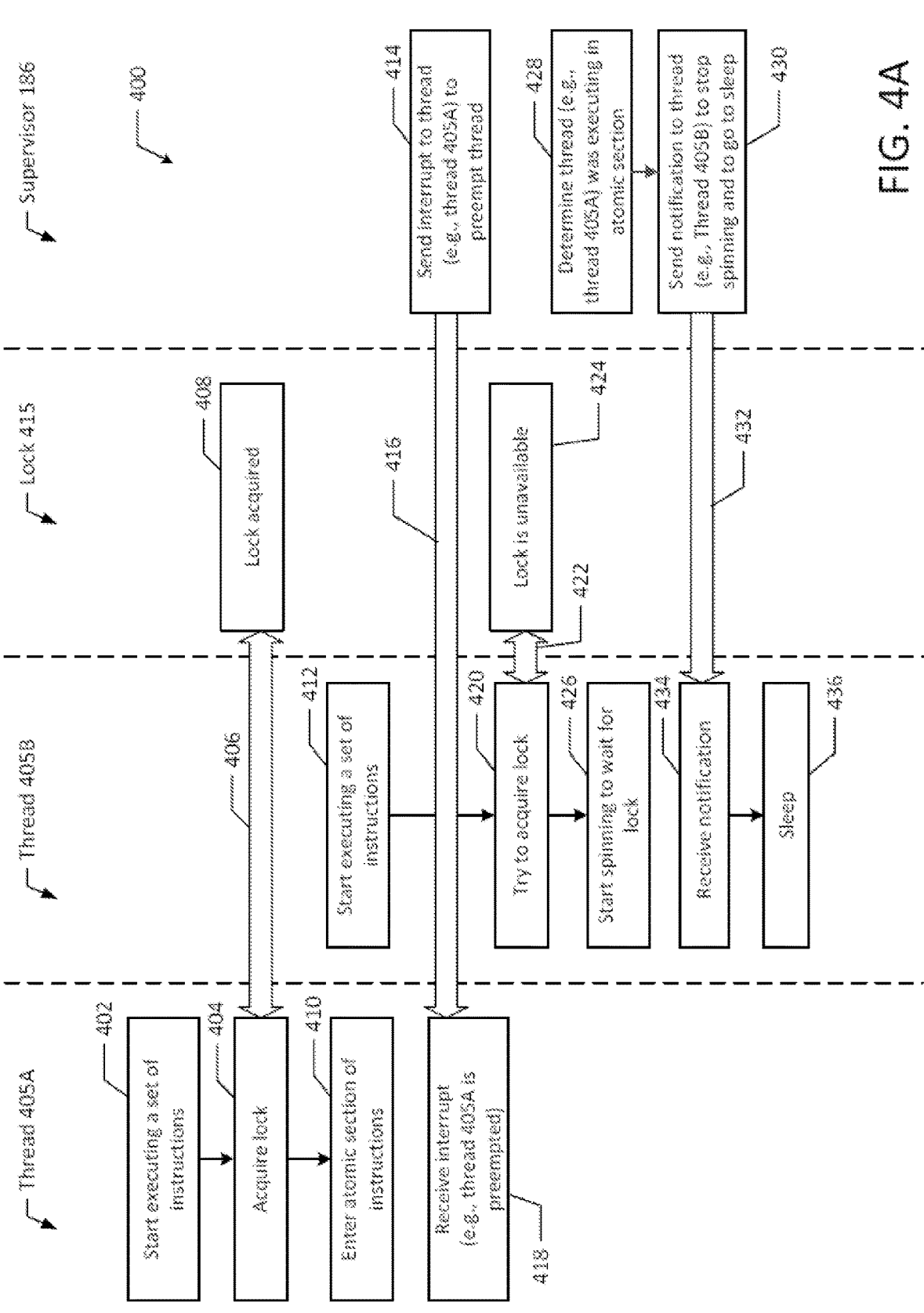
FIGS. 4A and 4B illustrate a flow diagram of an example process for reverse restartable sequences for lock polling scalability according to an example embodiment of the present disclosure.
Figure 4B:
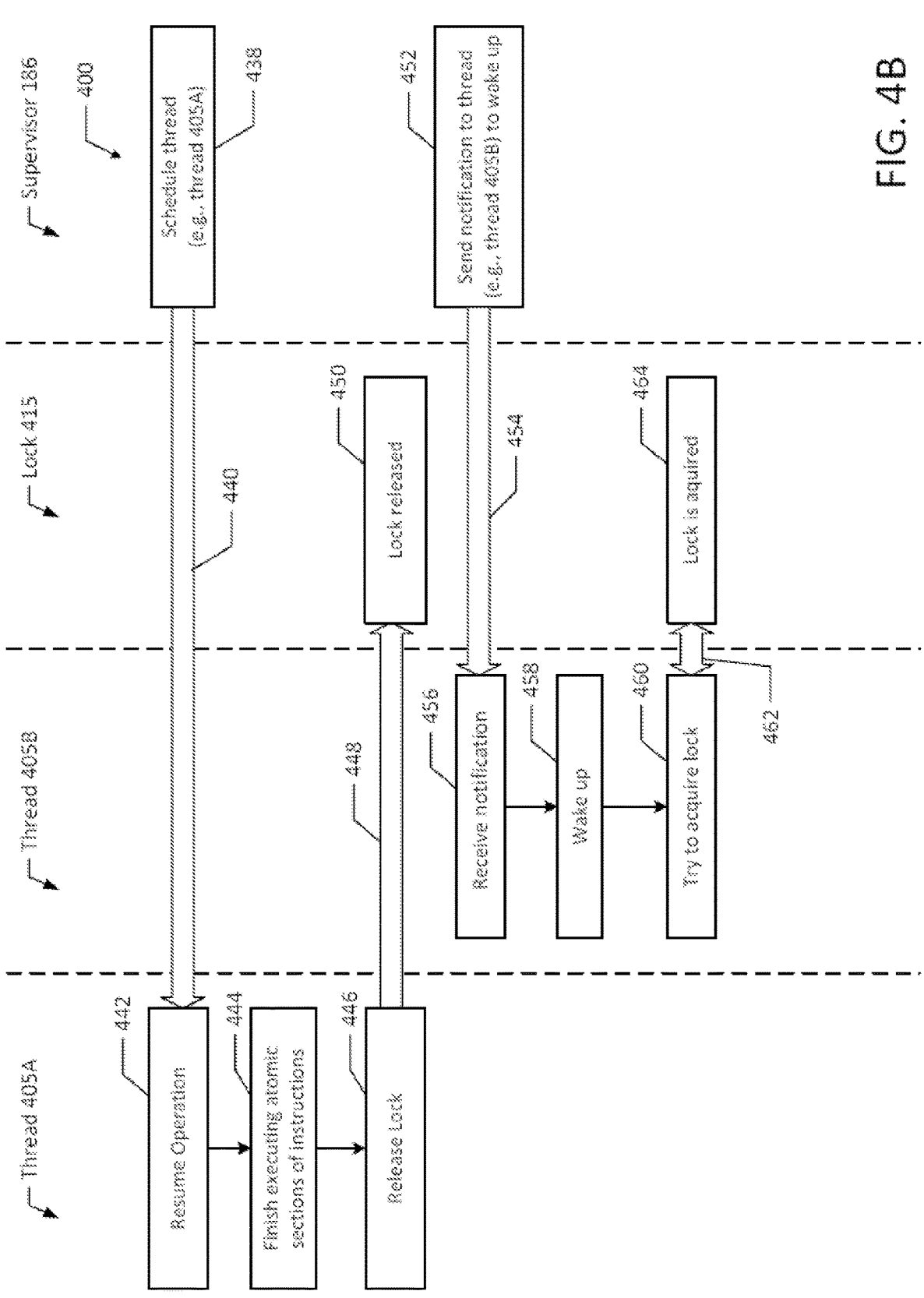

FIGS. 4A and 4B illustrate a flowchart of an example method 400 for reverse restartable sequences for lock polling scalability in accordance with an example embodiment of the present disclosure. Although the example method 400 is described with reference to the flowchart illustrated in FIGS. 4A and 4B, it will be appreciated that many other methods of performing the acts associated with the method 400 may be used. For example, the order of some of the blocks may be changed, certain blocks may be combined with other blocks, blocks may be repeated, and some of the blocks described are optional. For example, a supervisor 186 may communicate with threads 405A and 405B, which may correspond to hyper-threads 132A and 132C. The threads 405A and 405B may communicate with a lock 405 and the supervisor 186 to perform example method 400. The threads 405A-B in FIGS. 4A and 4B may be hyper-threads on the same CPU or different CPUs. Additionally, the threads 405A-B may be software threads on the same vCPU or different vCPUs.

In the illustrated example, thread 405A may start executing a set of instructions (block 402). Thread 405A may refer to a hardware thread or hyper-thread (e.g., hyper-thread 132A) or a software thread (e.g., thread 131A). At some point in the set of instructions, thread 405A may acquire a lock 415 (blocks 404 and 406). The lock 415 may ensure that only one process (e.g., process currently holding the lock) is accessing the resource at a time to prevent a processor or thread from obtaining information from the resource before the resources is updated or from accessing the resource while it is being modified, thereby resulting in a dirty read. Then, the lock 415 is acquired or owned by thread 405A (block 408). For example, once the lock 415 is acquired, thread 405A may access the protected resource and modify the resource according to the set of instructions.

After acquiring the lock 415, thread 405A may enter an atomic section of the set of instructions (block 410). The atomic section of code may be a portion of code that owns a lock and is tagged as atomic. In an example, the atomic section includes the instructions that run under the lock (e.g., instructions that do not run under the lock are not tagged as atomic). Example 1 and Example 2 shown below provide different scenarios of an atomic section where the jump instruction is under the lock and outside of the atomic section (e.g., Example 1) or where the jump instruction is within the atomic section (e.g., Example 2).

Example 1

```
LOCK:
LOCK OR [takes lock]
JMP LOCK
* start of atomic section *
ATOMIC SECTION
LOCK AND [frees lock]
* end of atomic section *
```

Example 2

```
LOCK:
LOCK OR [takes lock]
* start of atomic section *
JMP LOCK
ATOMIC SECTION
LOCK AND [frees lock]
* end of atomic section *
```

The jump instruction is an instruction to jump to the previous "LOCK OR" instruction to repeat the "LOCK OR" instruction to try to acquire the lock if the previous attempt failed. When the jump instruction is under the lock and outside of the atomic section (e.g., Example 1), then the lock is already in possession by the time the thread reaches the atomic section (e.g., the thread will obtain the lock at the "LOCK OR" instruction and continue to jump back to the "LOCK OR" instruction until the lock is obtained). In Example 1, if the thread is preempted at the "JMP LOCK" instruction, a full CPU cycle may be wasted jumping back to the "LOCK OR" instruction (e.g., polling for the lock for one CPU cycle). However, the chance of preemption occurring at the jump instruction is minimal and therefore does not add significant overhead.

In Example 2, where the jump instruction is in the atomic section, a non-lock owner (e.g., a thread that failed to obtain the lock at the "LOCK OR" instruction) may be preempted when the non-lock owner is executing the jump instruction within the atomic section. In Example 2, since the "JMP LOCK" instruction is in the atomic section, the system may think that the thread already has the lock. If a non-lock owner is preempted when it is executing the jump instruction, the supervisor 186 may detect that the address of the "JMP LOCK" instruction is the first instruction in the atomic section. Then, the supervisor 186 may check whether the jump instruction will be taken (e.g., jump outside of section to obtain the lock if the thread failed to obtain the lock during the "LOCK OR" instruction). If the thread failed to obtain the lock, the supervisor 186 may determine that a notification preventing other threads from polling or waiting for the lock is unnecessary. For example, since the lock is still available, other threads may proceed in a typical fashion to execute instructions and attempt to obtain the lock.

Another thread, for example thread 405B may also start or continue executing a set of instructions (block 412). While both thread 405A and thread 405B are executing instructions, a supervisor 186 may send an interrupt to thread 405A to preempt thread 405A (blocks 414 and 416). For example, thread 405A may be preempted so the supervisor 186 can schedule higher priority tasks or perform other work. Then, thread 405A receives the interrupt and is preempted (block 418). Once thread 405A is preempted, it is prevented from executing further instructions.

Thread 405B may attempt to acquire the lock 415 that was previously acquired by thread 405A (blocks 420 and 422). For example, thread 405B may also attempt to obtain information from the resource protected by the lock 415. Thread 405B may attempt to acquire the lock before thread 405A is preempted or after thread 405A is preempted. However, since thread 405A acquired the lock 415, the lock 415 is unavailable (block 424). Allowing only a single processor or thread to hold or own the lock at a time ensure that only one process (e.g., process currently holding the lock) is accessing the resource to prevent a processor or thread from obtaining information from the resource before the resources is updated or from accessing the resource while it is being modified, thereby resulting in a dirty read. Since the lock 415 is unavailable, thread 405B may start spinning to wait for the lock 415 (block 426). For example, thread 405B may poll or spin while waiting for the lock 415. However, spinning wastes CPU cycles without performing useful work.

The supervisor 186 may determine that thread 405A was executing in the atomic section when preempted (block 428) and may send a notification to thread 405B to stop spinning and to go to sleep (blocks 430 and 432). For example, thread 405B may be notified to enter a sleep state prior to polling. By notifying thread 405B to enter a sleep state, thread 405B may sleep instead of cycling in a spin loop and wasting resources. Then, thread 405B receives the notification (block 434) and goes to sleep (block 436). In another example, thread 405B may advantageously execute new operations while the lock is unavailable to optimize performance and reduce processor down time.

Continuing on FIG. 4B, supervisor 186 may schedule thread 405A (blocks 438 and 440). For example, the supervisor 186 may send an instruction to thread 405A to resume operation. Then, thread 405A resumes operation (block 442). For example, the higher priority work scheduled by the supervisor 186 may have been competed such that thread 405A can be rescheduled to proceed with executing its set of instructions. After resuming operation, thread 405A finishes executing the atomic section of the set of instructions (block 444) and releases the lock (blocks 446 and 448). For example, thread 405A may finish modifying the protected resource and then may release the lock. Then, the lock 415 is released (block 450). By releasing the lock after modifying the resource, thread 405A ensures that access to the resource is available after resource has been updated to ensure that another thread accessing the resource in the future can perform a clean read.

After the lock is released, supervisor 186 may send a notification to thread 405B to wake up (blocks 452 and 454). For example, the supervisor 186 may notify or instruct thread 405B to wake-up from the sleep state. Thread 405B receives the notification (block 456) and wakes up (block 458). Then, thread 405B may attempt to acquire the lock 415 again (blocks 460 and 462). Since the lock was released by thread 405A, the lock is now acquired and owned by thread 405B (block 464).

Figure 5:
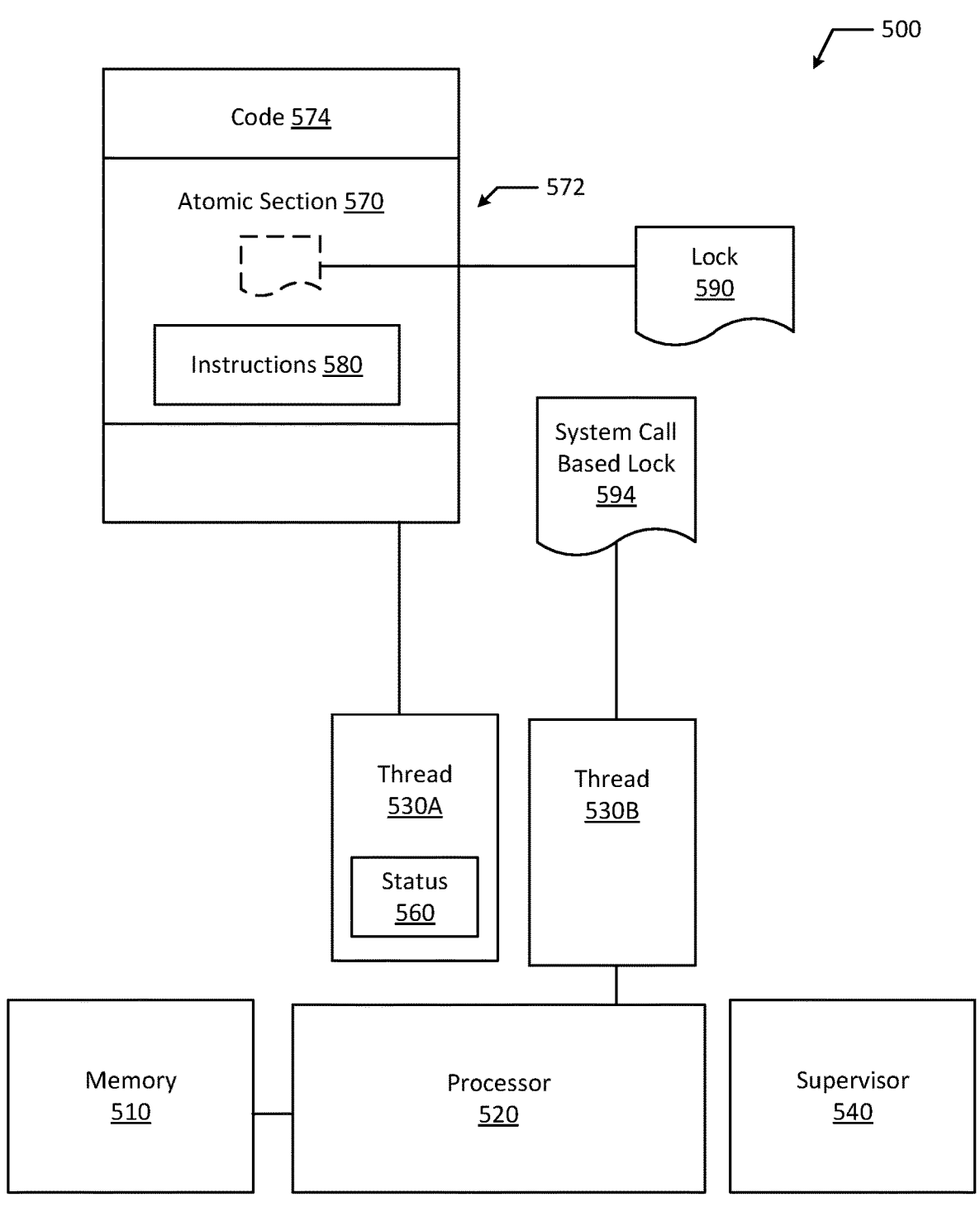
FIG. 5 illustrates a block diagram of an example reverse restartable sequence system according to an example embodiment of the present disclosure.

FIG. 5 is a block diagram of an example reverse restartable sequence system 500 according to an example embodiment of the present disclosure. System 500 includes a memory 510, a processor 520 in communication with the memory 510, a plurality of threads 530A-B executing on the processor 520, and a supervisor 540. The supervisor 540 may be configured to preempt a first thread 530A of the plurality of threads 530A-B and determine a status 560 of the first thread 530A as either (i) executing in an atomic section 570 or (ii) executing outside of the atomic section 570. The atomic section 570 is a region 572 of code 574 tagged as atomic, and the atomic section 570 includes instructions 580 that run under a lock 590. Responsive to determining the status 560 as executing in the atomic section 570, the supervisor 540 is configured to notify a second thread 530B of the plurality of threads 530A-B to execute a system call based lock 594 to block execution until the lock 590 is released by the first thread 530A.

By blocking execution until the lock is released, the system 500 advantageously prevents wasting CPU cycles spinning while waiting for a lock 590 and also reduces latency that is incurred using a polling mutex when the lock owner is delayed. Furthermore, to ensure that other threads (e.g., thread 530B) are notified only when the lock 590 is taken, the atomic section 570 may include instructions that run under the lock 590 such that only the thread owning the lock (e.g., thread 530A) runs within the atomic section 570. System 500 advantageously prevents system calls (even with contended locks) until a lock owner is actually preempted thereby improving performance and throughput.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The invention is claimed as follows:

1. A method comprising:
preempting, by a supervisor, a first thread while the first thread is executing in an atomic section to schedule a higher priority task, wherein the supervisor is a privileged software component of an operating system associated with the first thread, and wherein the supervisor handles interrupts;
determining, by the supervisor, a status of the first thread as executing in the atomic section when preempted, wherein the atomic section is a region of code tagged as atomic and involves modifying a protected resource;
responsive to determining the status as executing in the atomic section, notifying, by the supervisor, a second thread to enter a sleep state after polling;
subsequent to notifying the second thread to enter the sleep state, transmitting, by the supervisor, an instruction to resume operation to the first thread after completing the higher priority task to cause the first thread to finish modifying the protected resource by continuing to execute the atomic section from a location in the atomic section at which the supervisor pre-empted the first thread; and
subsequent to transmitting the instruction to resume operation to the first thread and finishing execution of the atomic section by the first thread, waking up, by the supervisor, the second thread from the sleep state.

2. The method of claim 1, wherein polling includes using a spinlock.

3. The method of claim 1, wherein the second thread is notified to enter the sleep state after a time interval.

4. The method of claim 1, wherein the supervisor pre-empts the first thread by sending an interrupt.

5. The method of claim 1, wherein the first thread and the second thread execute on the same processor.

6. The method of claim 1, wherein the first thread and the second thread execute on different processors.

7. The method of claim 1, wherein the supervisor notifies the second thread to enter the sleep state after polling for a time interval.

8. The method of claim 1, wherein each of a plurality of threads, which includes the first thread and the second thread, includes a respective thread identifier, and wherein a notification from the supervisor includes the respective thread identifier of the thread being preempted.

9. The method of claim 8, wherein at least one of the first thread and the second thread are configured to compare the thread identifier to an owner identifier.

10. The method of claim 1, wherein the supervisor sends an interrupt to the second thread.

11. A system comprising:

a memory;

at least one processor in communication with the memory;

a plurality of threads executing on the at least one processor; and a supervisor, wherein the supervisor is a privileged software component of an operating system executing on the at least one processor, and wherein the supervisor is configured to:

preempt a first thread while the first thread is executing in an atomic section to schedule a higher priority task;

handle interrupts;

determine a status of the first thread as executing in the atomic section when preempted, wherein the atomic section is a region of code tagged as atomic and involves modifying a protected resource;

responsive to determining the status as executing in the atomic section, notify a second thread to enter a sleep state after polling;

subsequent to notifying the second thread to enter the sleep state, transmit an instruction to resume operation to the first thread after completing the higher priority task to cause the first thread to finish modifying the protected resource by continuing to execute the atomic section from a location in the atomic section at which the supervisor pre-empted the first thread; and subsequent to transmitting the instruction to resume operation to the first thread and finishing execution of the atomic section by the first thread, wake up the second thread from the sleep state.

12. The system of claim 11, wherein polling includes using a spinlock.

13. The system of claim 11, wherein the second thread is notified to enter the sleep state after a time interval.

14. The system of claim 11, wherein the supervisor preempts at least one thread by sending an interrupt.

15. The system of claim 11, wherein the first thread and the second thread execute on the same processor.

16. The system of claim 11, wherein the first thread and the second thread execute on different processors.

17. The system of claim 11, wherein the supervisor notifies the second thread to enter the sleep state after polling for a time interval.

18. A non-transitory computer readable medium storing instructions, which when executed by a processor, causes the processor to:

preempt, by a supervisor, a first thread while the first thread is executing in an atomic section to schedule a higher priority task, wherein the supervisors a privileged software component of an operating system associated with the first thread, and wherein the supervisor handles interrupts;

determine, by the supervisor, a status of the first thread as executing in the atomic section when preempted, wherein the atomic section is a region of code tagged as atomic and involves modifying a protected resource;

responsive to determining the status as executing in the atomic section, notify, by the supervisor, a second thread to enter a sleep state;

subsequent to notifying the second thread to enter the sleep state, transmit, by the supervisor, an instruction to resume operation to the first thread after completing the higher priority task to cause the first thread to finish modifying the protected resource by continuing to execute the atomic section from a location in the atomic section at which the supervisor pre-empted the first thread; and subsequent to transmitting the instruction to resume operation to the first thread and finishing execution of the atomic section by the first thread, wake up, by the supervisor, the second thread from the sleep state.

* * * * *